US012583377B2

(12) United States Patent
Schulz et al.

(10) Patent No.: US 12,583,377 B2
(45) Date of Patent: Mar. 24, 2026

(54) FASTENING DEVICE FOR FASTENING A HEADLAMP IN A MOTOR VEHICLE, A HEADLAMP ASSEMBLY, A MOTOR VEHICLE, A KIT COMPRISING A PLURALITY OF FASTENING DEVICES

(71) Applicant: Marelli Germany GmbH, Reutlingen (DE)

(72) Inventors: Bernd Schulz, Reutlingen (DE); Carsten Otto, Esslingen (DE); Ulrich Neubauer, Weilheim (DE)

(73) Assignee: Marelli Germany GmbH, Reutlingen (DE)

( * ) Notice: Subject to any disclaimer, the term of this patent is extended or adjusted under 35 U.S.C. 154(b) by 0 days.

(21) Appl. No.: 18/999,599

(22) Filed: Dec. 23, 2024

(65) Prior Publication Data

US 2025/0214503 A1 Jul. 3, 2025

(30) Foreign Application Priority Data

Dec. 28, 2023 (DE) .......................... 102023136788.9

(51) Int. Cl.
*B60Q 1/04* (2006.01)
*B60Q 1/00* (2006.01)

(52) U.S. Cl.
CPC ......... *B60Q 1/0441* (2013.01); *B60Q 1/0005* (2013.01); *B60Q 1/0433* (2013.01); *B60Q 2900/10* (2013.01)

(58) Field of Classification Search
CPC .. B60Q 1/0495; B60Q 2900/10; B60Q 1/263; B60Q 1/0441; B60Q 1/0005
See application file for complete search history.

(56) References Cited

U.S. PATENT DOCUMENTS 11,077,784 B2 * 8/2021 Kueppers ............. B60Q 1/0064
12,325,351 B2 * 6/2025 Mikulenka ........... B60Q 1/0491

FOREIGN PATENT DOCUMENTS

DE 27 21 554 A1 11/1978
FR 3070145 A1 * 2/2019 ........... B60Q 1/0495

* cited by examiner

*Primary Examiner* — Robert J May
(74) *Attorney, Agent, or Firm* — Howard & Howard Attorneys PLLC

(57) ABSTRACT

The invention relates to a fastening device for fastening a headlamp in a motor vehicle, having a first and a second fastening element, which are connected to one another by means of a latching connection, wherein the first fastening element and/or the second fastening element have a predetermined breaking point.

14 Claims, 4 Drawing Sheets

A-A

B-B

C

FASTENING DEVICE FOR FASTENING A HEADLAMP IN A MOTOR VEHICLE, A HEADLAMP ASSEMBLY, A MOTOR VEHICLE, A KIT COMPRISING A PLURALITY OF FASTENING DEVICES

CROSS-REFERENCE TO RELATED APPLICATIONS

This application claims priority pursuant to 35 U.S.C. 119(a) to German Application No. 102023136788.9, filed Dec. 28, 2023, which application is incorporated herein by reference in its entirety.

PRIOR ART

From DE 27 21 554 A1, a device for fastening headlamps to motor vehicles is known which is formed separately from the headlamp, wherein the device is arranged between a lower and an upper crossmember of the motor vehicle and the device is fastened to the headlamp housing by means of rivets.

SUMMARY OF THE INVENTION

The invention is based on the object of providing a fastening device for fastening a headlamp in a motor vehicle, which ensures a defined failure and a simple and rapid assembly.

The object on which the invention is based is achieved by a subject-matter having the features of claim 1.

The fastening device is used for fastening a headlamp in a motor vehicle. The fastening device comprises a first fastening element for fastening the fastening device to the motor vehicle and a second fastening element, which is formed separately from the first fastening element, for fastening the fastening device to the headlamp. The first fastening element and the second fastening element can be reversibly detachably connected to one another by means of a latching connection. Furthermore, a predetermined breaking point is provided on the first fastening element and/or on the second fastening element.

This has the advantage of making possible a defined failure of the fastening device, so that the motor vehicle and/or the headlamp are protected from damage. In addition, the latching connection ensures simple and rapid assembly of the headlamp in the vehicle and/or of the fastening device. The latching connection of the fastening device also results in lower manufacturing and assembly tolerances, e.g. compared to the motor vehicle.

The provision of the predetermined breaking point also means that in the event of damage, only the first fastening element or the second fastening element needs to be replaced, while the second fastening element or the first fastening element can remain in the motor vehicle.

It is conceivable that the first fastening element is formed in one piece or in multiple pieces for the motor vehicle and/or that the second fastening element is formed in one piece or in multiple pieces for the headlamp housing.

For assembling the fastening device, the first fastening element is pressed hydraulically into the second fastening element, in particular by means of a tool. The latching connection, in particular in conjunction with the pressing, represents in particular a positive-locking and frictional connection and preferably ensures a play-free arrangement of the headlamp in the motor vehicle or of the first fastening element in the second fastening element or of the second fastening element in the first fastening element.

It is advantageous if the predetermined breaking point is formed as a local material taper. Accordingly, the predetermined breaking point can easily be provided on the first fastening element and/or on the second fastening element.

An advantageous embodiment of the invention provides that the first fastening element or the second fastening element has a truncated cone extending along a cone axis. The predetermined breaking point is preferably arranged on the truncated cone. By means of the arrangement of the predetermined breaking point along the truncated cone, due to the differing cross-section a different failure force of the predetermined breaking point can also be set.

Preferably, if the truncated cone is arranged on the first fastening element, the truncated cone will have a first cone end facing the second fastening element and a second cone end opposite the first cone end along the cone axis and facing the first fastening interface. Preferably, when the truncated cone is arranged on the second fastening element, the truncated cone will have a first cone end facing the first fastening element and a second cone end opposite the first cone end along the cone axis and facing the second fastening interface. Preferably, the truncated cone tapers along the cone axis from the first cone end to the second cone end. It is advantageous if the predetermined breaking point is arranged in the region of the second cone end. Accordingly, the cross-section of the truncated cone is reduced in the region of the predetermined breaking point.

It is advantageous if the truncated cone is formed to be hollow. The truncated cone has a constant cone wall thickness along the cone axis with the exception of a local reduction in the cone wall thickness at the predetermined breaking point. Within the meaning of the invention, a "constant cone wall thickness" is understood to mean a deviation of a maximum of 10%, in particular 5%, preferably 3%. A "local reduction in the cone wall thickness at the predetermined breaking point" can be understood to mean a reduction in the wall thickness of at least 10%, in particular of at least 20%, preferably of at least 30% and preferably of at least 50% compared to the otherwise constant cone wall thickness.

A further advantageous development provides that the first fastening element and/or the second fastening element have a latching section. The latching section preferably acts in conjunction with the first fastening element or with the second fastening element to form the latching connection.

Preferably, the latching section has at least one undercut. The undercut is preferably accessible from an upper side and/or a lower side of the latching section.

It is advantageous if the first fastening element has at least one latching hook for latching connection with the second fastening element, in particular with the latching section. Alternatively, it is advantageous if the second fastening element has at least one latching hook for latching connection with the first fastening element, in particular with the latching section. Preferably, the latching hook engages in the latching section, in particular the undercut of the latching hook, so that the second fastening element is secured on or in the first fastening element or the first fastening element is secured on or in the second fastening element. Accordingly, the headlamp is ultimately also secured to or in the motor vehicle. The latching hook and/or the undercut provide an easy-to-manufacture and easy-to-assemble latching connection between the first fastening element and the second fastening element.

A further advantageous development provides that the first fastening element or the second fastening element has a guide section for receiving and/or guiding the second fastening element or the first fastening element. The guide section can have a lateral first guide and a lateral second guide, wherein the guides are arranged in particular on a left-hand side surface and a right-hand side surface of the first fastening section or of the second fastening element. Accordingly, it is ensured that the second fastening element or the first fastening element is positioned exactly and the latching connection can be established.

Preferably, the second fastening element has a sliding section that acts in conjunction with the guide section, in particular with the lateral guides, when the second fastening element is inserted into the first fastening element. Preferably, alternatively, the first fastening element has a sliding section that acts in conjunction with the guide section, in particular with the lateral guides, when the first fastening element is inserted into the second fastening element. The sliding section can have a lateral first slider and a lateral second slider, wherein the sliders are arranged in particular on a left-hand side surface and on a right-hand side surface of the second fastening element or of the first fastening element. Accordingly, it is further ensured that the second fastening element or the first fastening element is positioned precisely and that the latching connection can be established.

A preferred embodiment of the invention provides that the predetermined breaking point is arranged on the first fastening element. Preferably, the first fastening element is formed in two pieces for the motor vehicle. Preferably, the second fastening element is formed in one piece for the headlamp, in particular for the headlamp housing. Furthermore, the truncated cone is preferably arranged on the first fastening element, wherein the predetermined breaking point is provided in particular on the first truncated cone.

The object underlying the invention is also achieved by a headlamp with a headlamp housing and with a second fastening element, described above, firmly connected to the headlamp, in particular to the headlamp housing. Preferably, the headlamp, in particular the headlamp housing, and the second fastening element are formed in one piece.

The object underlying the invention is also achieved by a headlamp assembly having the features of claim 11. Accordingly, the headlamp assembly has a described fastening device and a headlamp for a motor vehicle.

It is conceivable that, in each case, a described fastening device is arranged at the top and/or the bottom and/or to the left and/or to the right of the headlamp. It is also conceivable that a described fastening device and a fastening device known from the prior art are used together, wherein one is arranged above and one below or one to the left and one to the right of the headlamp.

The fastening device, in particular the first fastening element and/or the second fastening element, are preferably formed separately from the headlamp. If the fastening device fails, only the fastening device, in particular the first fastening element and/or the second fastening element, will need to be replaced. Consequently, in this case there is no need to replace the headlamp.

The fastening device is preferably formed such that in the event of damage, the fastening device, in particular the first fastening element, is destroyed and the headlamp is thus protected from damage. In the event of damage, the headlamp can accordingly remain in the vehicle and only the fastening device, in particular the first fastening element and/or the second fastening element, needs to be replaced.

The object underlying the invention is also achieved by a motor vehicle having the features of claim 13. The motor vehicle has a described fastening device or a described headlamp assembly.

Furthermore, the object underlying the invention is achieved by a kit according to claim 14. The kit comprises a plurality of fastening devices, in particular the described fastening devices, for different motor vehicles and/or for different headlamps.

It is advantageous if the kit comprises a plurality of first fastening elements and a second fastening element, wherein the interface, in particular the guide section and/or the latching section and/or the latching hook, are of the same design. Accordingly, the same latching connection concept can be used for different headlights and/or motor vehicles.

Further details and advantageous embodiments of the invention can be found in the following description, on the basis of which an exemplary embodiment of the invention is described and explained in more detail.

DETAILED DESCRIPTION OF THE
INVENTION

Figure 7:
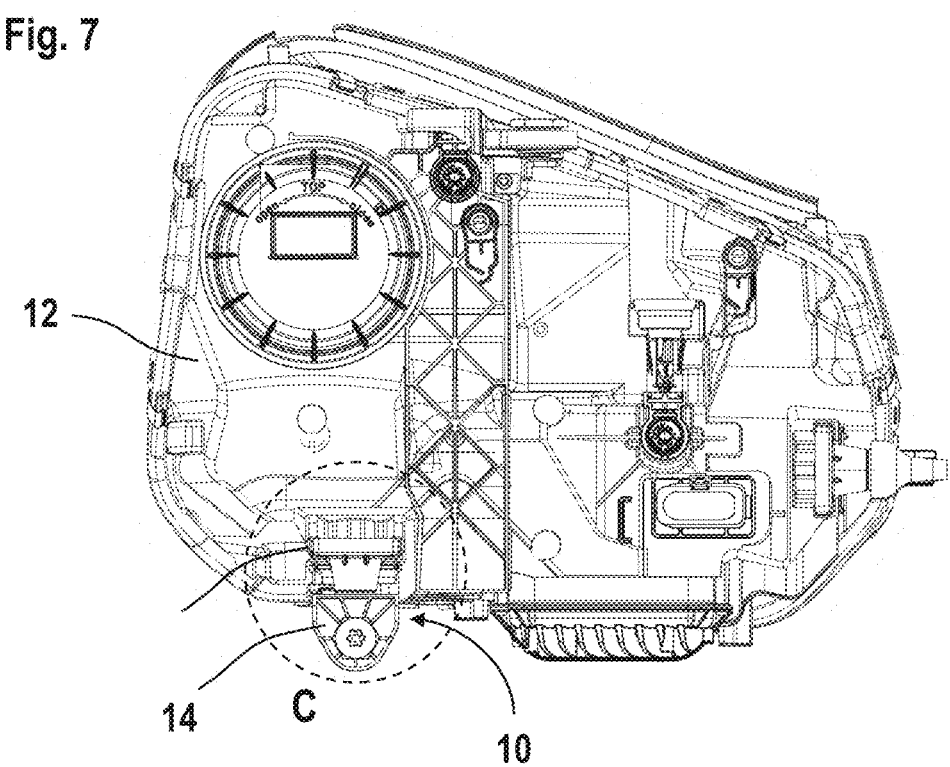
Figure 8:
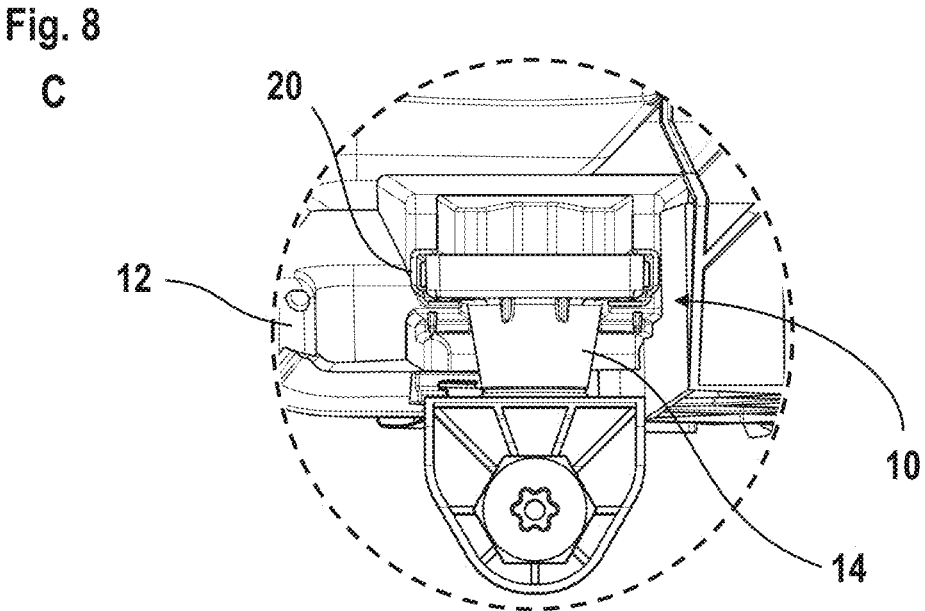

The fastening device 10 is used for fastening a headlamp 12 shown in FIGS. 7 and 8 in a motor vehicle (not shown), wherein FIG. 8 is a detailed view of the detail C in FIG. 7. The fastening device 10 is formed separately from the motor vehicle. According to FIG. 2, the fastening device 10 comprises a first fastening element 14 having a first fastening interface 16 for fastening the fastening device 10 to the motor vehicle. The first fastening interface 16 is preferably fastened to the motor vehicle, in particular to a crossmember, by means of fastening means, in particular screws. Alternatively, the first fastening means 14 can be formed in one piece with the motor vehicle.

Figure 2:
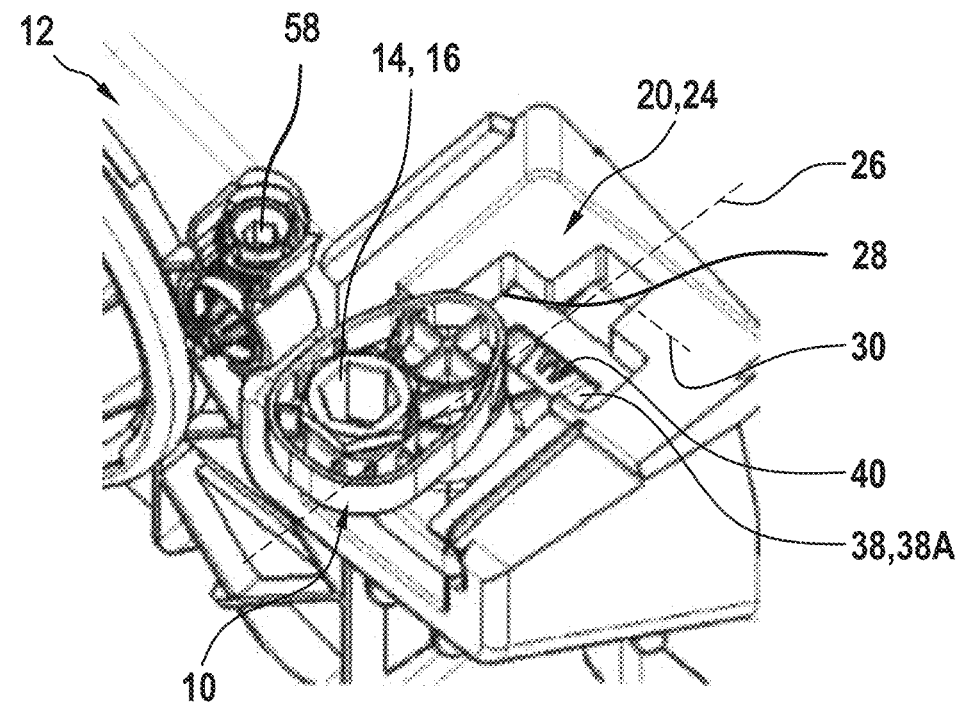

The fastening device 10 further comprises a second fastening element 20 having a second fastening interface 22 for fastening the fastening device 10 to the headlamp 12, in particular to a headlamp housing of the headlamp. The second fastening interface 22 is preferably formed in one piece with the headlamp 12, in particular with the headlamp housing. Alternatively, the second fastening means 20 can be fastened to the headlamp 12 by means of fastening means, in particular screws. In FIGS. 2, 7 and 8 the fastening device 10 is shown mounted on the headlamp 12.

The first fastening element 14 and the second fastening element 20 are formed separately from one another. The first fastening element 14 and the second fastening element 20 can be reversibly connected and detached from one another by means of a latching connection.

Figure 5:
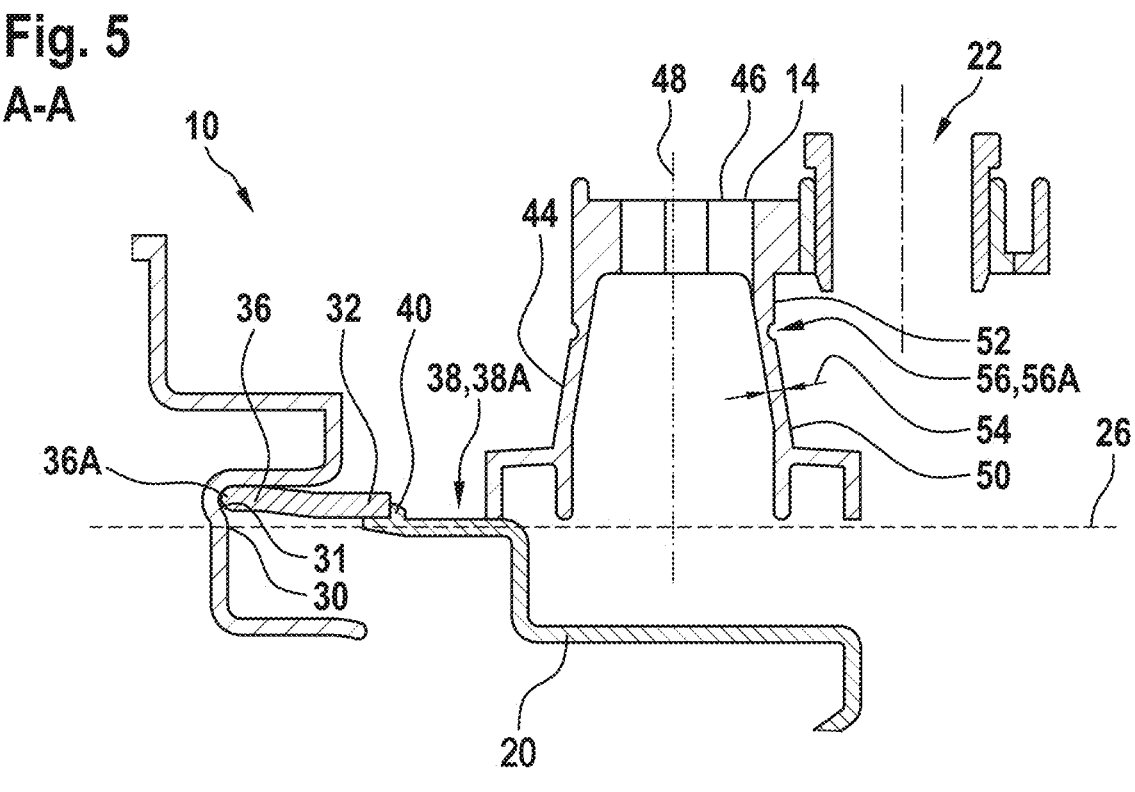
Figure 6:
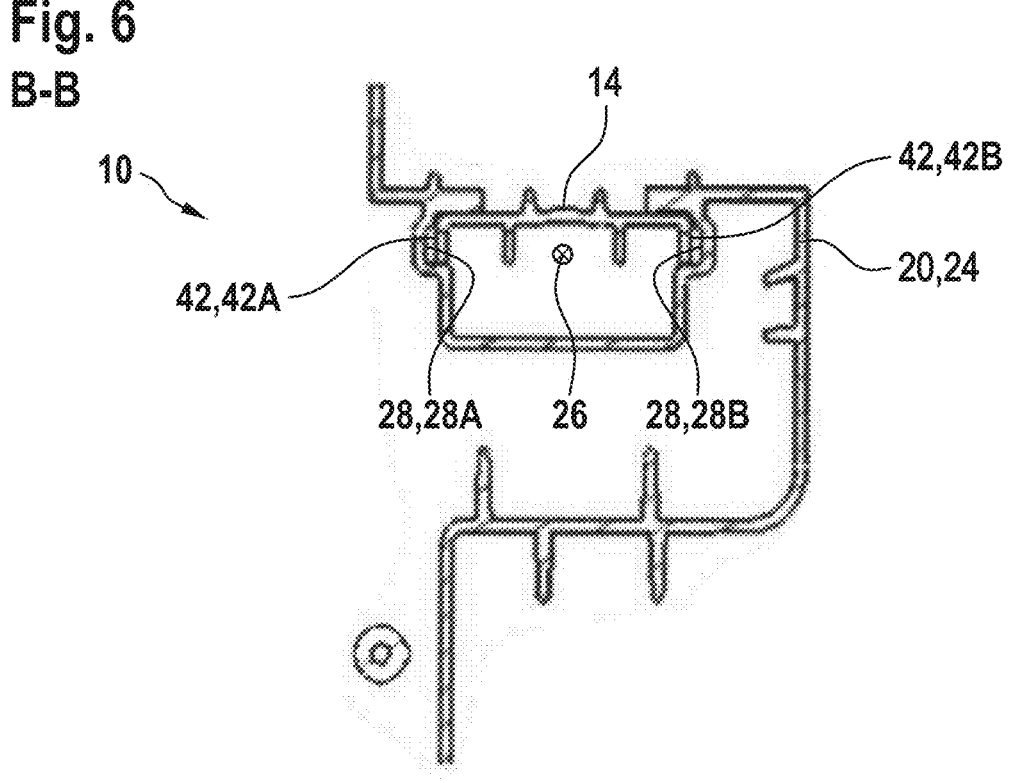

According to FIGS. 2 and 6, the second fastening element 20 has a second housing 24 having a guide section 28 extending along a guide axis 26 for receiving and guiding the first fastening element 14. For this purpose, the guide section 28 has a first guide 28A and a second guide 28B, wherein the first guide 28A is arranged on the left-hand side and the second guide 28B is arranged on the right-hand side. For connecting the first fastening element 14 and the second fastening element 20, the first fastening element 14 is inserted along the guide axis 26 into the guide 28 up to an assembly end stop 30 according to FIG. 5, wherein the first fastening element 14 is then arranged in a latching position.

Figure 1:
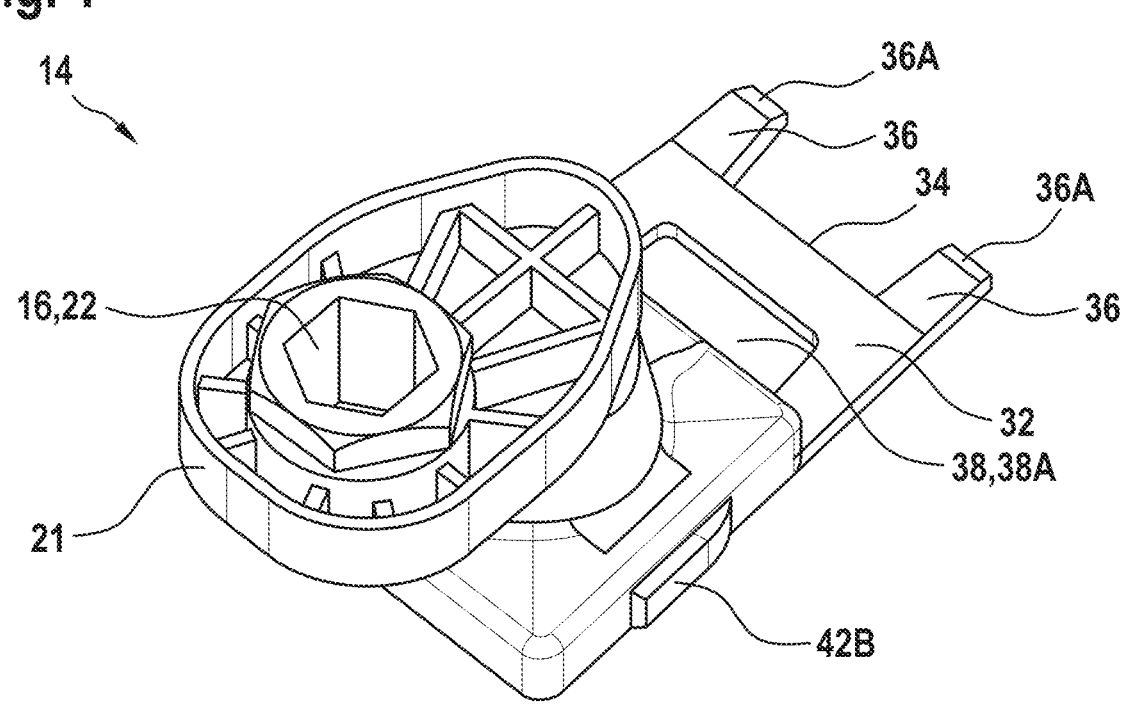
FIGS. 1 to 8 show a fastening device for fastening a headlamp in a motor vehicle.

According to FIG. 1, the first fastening element 14 has a first housing 21 having a latching section 32, which is preferably formed in a cassette shape. Preferably, two projecting stop lugs 36 extending parallel to the guide axis 26 are provided on a front side 34 of the latching section 32 facing the assembly end stop 30. In the latching position, the stop lugs 36 of the first fastening element 14 come to abut the assembly end stop 30 of the second fastening element 20.

The latching section 32 further has an undercut 38 according to FIGS. 1 and 5. The undercut 38 is preferably formed as a recessed pocket having a pocket bottom. According to FIGS. 2 and 5, the first fastening element 14 has a latching hook 40, which is arranged in particular between the first guide 28A and the second guide 28B. The latching hook 40 is preferably formed as a projection and/or a raised section, which is arranged in particular in the region of a free end of a tab of the second fastening element 20. In the latching position, the latching hook 40 according to FIG. 5 engages behind the latching section 32, in particular the undercut 38. The second fastening element 20 is secured in the first fastening element 14. The latching hook 40 is preferably formed to be flexible and is pushed upwards when the second fastening element 20 is inserted into the guide section 28 and in the latching position snaps into the undercut 38. It is also conceivable for the pocket to be arranged at the top and/or bottom, wherein the latching hook 40 engages in the undercut depending on the accessibility of the pocket.

The undercut 38 is alternatively formed as a continuous recess 38A according to FIGS. 1 and 2, wherein according to FIG. 2 the latching hook 40 is initially pushed downwards and then engages in the undercut 38 from below. Alternatively, the latching hook can initially be pushed upwards and then engage in the undercut 38 from above. For improved insertion of the first fastening element 14, the front side 34 of the latching section 32, in particular the stop lugs 36 at their free end 36A, are curved upwards and/or arcuate and/or curved away from the latching hook 40, so that the latching section 32 can be pushed over the latching hook 40 and the latching hook 40 be pressed downwards by the latching section 32 during further insertion until the latching hook 40 engages in the undercut 38.

For the precisely positioned arrangement of the latching section 32, in particular of the stop lugs 36, the assembly end stop 30 according to FIG. 5 has an, in particular recessed, lug receptacle 31 which receives the stop lug 36 at least substantially free of play. In this way, the first fastening element 14 can be fixed in a precise position by means of the latching hook 40 and the lug receptacle 31.

Furthermore, the latching section 32 according to FIGS. 1 and 6 has a sliding section 42 on the side having a first slider 42A on the left-hand side and a second slider 42B on the right-hand side, wherein the sliding section 42, in particular the first slider 40A and the second slider 42B, acts in conjunction with the guide section 28.

Figure 3:
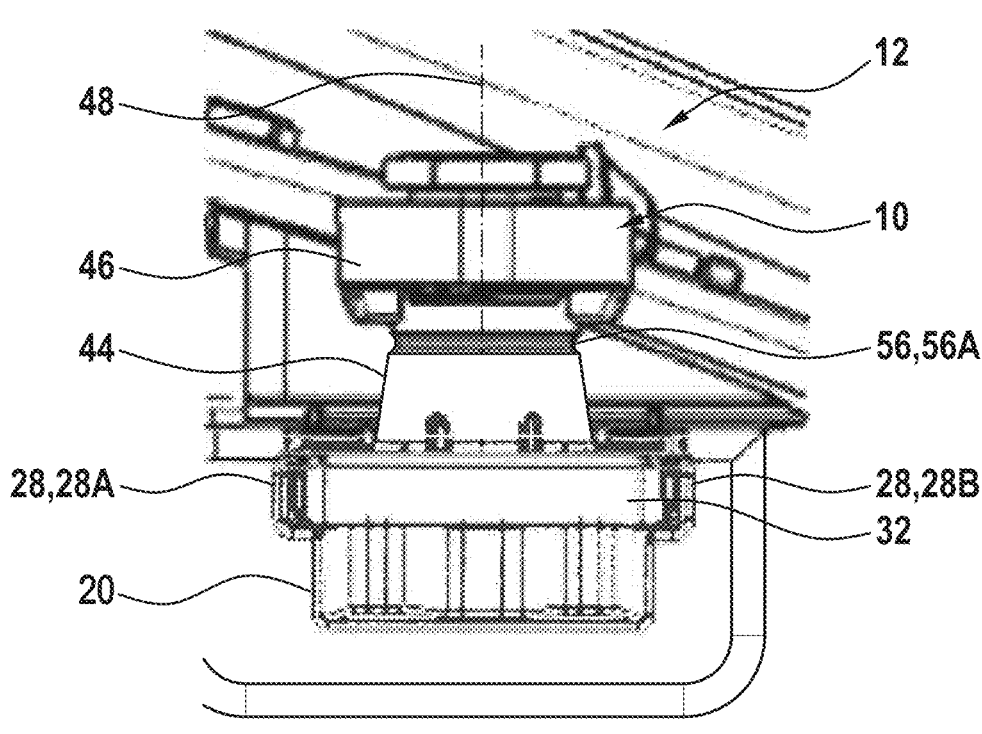
Figure 4:
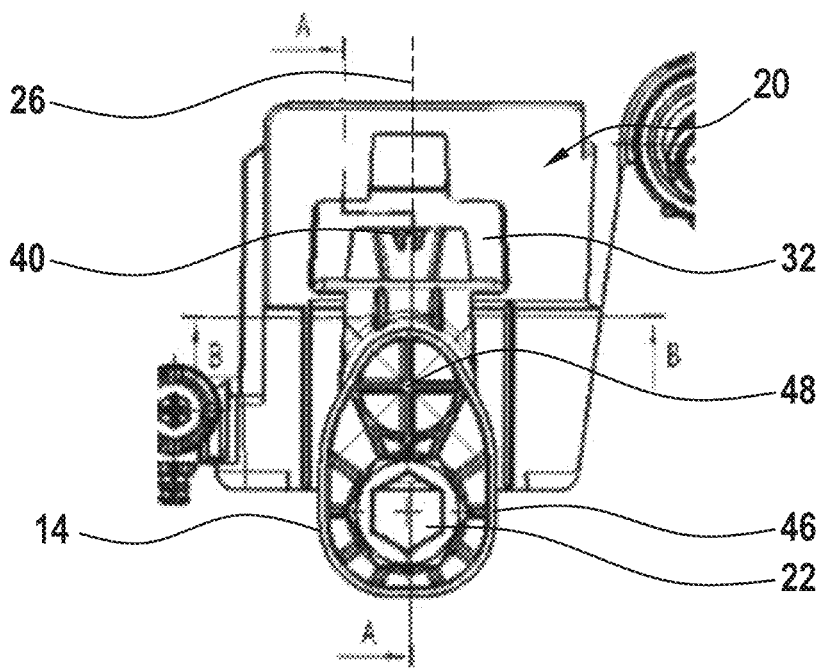

The first fastening element 14 also has, according to FIGS. 3 and 5, a truncated cone 44 adjacent to the latching section 32 and a head section 46 adjacent to the truncated cone 44. The truncated cone 44 is preferably arranged between the latching section 32 and the head section 44. The undercut 38 is preferably arranged between the truncated cone and the stop lugs 36.

The truncated cone 44 extends according to FIGS. 3 and 5 along a cone axis 48, which runs perpendicularly to the guide axis 26 in the latching position. The truncated cone 44 is preferably formed to be hollow. The truncated cone 44 has a first cone end 50 facing the second fastening element 20 and a second cone end 52 opposite the first cone end 50 and facing the first fastening interface 16 and/or the head section 46. The truncated cone 44 tapers along the cone axis 48 from the first cone end 50 to the second cone end 52, i.e. the diameter of the truncated cone 44 decreases. The truncated cone 44 also has a cone wall thickness 54, which is at least partially constant along the cone axis 48, with the exception of a local reduction. For forming a predetermined breaking point 56, a material taper is formed on the truncated cone 44. Should a defined failure force act on the headlamp 12 and/or on the motor vehicle and/or on the fastening device 10, the predetermined breaking point 56 will fail, so that damage to the remaining components is reduced or prevented. The material taper can preferably be formed by a groove 56A introduced into the truncated cone 44 from radially outside. Accordingly, the predetermined breaking point 56 can also be easily introduced if the truncated cone 44 is already mounted on the latching section 32 and/or on the head section 46. It is advantageous if the latching section 32 and/or the truncated cone 44 and/or the head section 46 are formed in one piece, in particular are injection-molded together. The groove 56A can preferably already be provided during the injection-molding process.

The cone wall thickness 54 is preferably substantially constant between the first cone end 50 and the predetermined breaking point 56 and/or between the second cone end 52 and the predetermined breaking point.

The head section 46 has the first fastening interface 16, wherein the first fastening interface 16 in particular receives the fastening means. The fastening interface 16 extends parallel to the cone axis 48 and is arranged at a distance from the cone axis 48.

Furthermore, a tolerance compensation element 58, preferably in the form of a screw, in particular having a hexagon socket, can be arranged on the fastening device 10. The tolerance compensation element 58 can preferably be arranged on the first fastening element 14, in particular on the first fastening interface 16, or on the second fastening element 20, in particular on the second fastening interface 22, and is preferably height-adjustable, so that the distance from the motor vehicle can be individually adjusted.

The invention claimed is:

1. A fastening device for fastening a headlamp in a motor vehicle, the fastening device comprising:
    a first fastening element having a first fastening interface for fastening to the motor vehicle;
    at least one second fastening element formed separately from the first fastening element and having a second fastening interface for fastening to the headlamp;
wherein the first fastening element and the second fastening element can be reversibly connected to one another by means of a latching connection, and wherein a predetermined breaking point is provided on the first fastening element and/or on the second fastening element; and
wherein the first fastening element has a guide section extending along a guide axis for guiding the second fastening element or wherein the second fastening element has a guide section extending along a guide axis for guiding the first fastening element.

2. The fastening device according to claim 1, wherein the predetermined breaking point is formed as a local material taper.

3. The fastening device according to claim 1, wherein the first fastening element or the second fastening element has a truncated cone, and wherein the predetermined breaking point is arranged on the truncated cone.

4. The fastening device according to claim 3, wherein the truncated cone arranged on the first fastening element has a first cone end facing the second fastening element and a second cone end opposite the first cone end and facing the first fastening interface, and wherein the truncated cone tapers from the first cone end to the second cone end.

5. The fastening device according to claim 3, wherein the truncated cone is formed to be hollow, and wherein the truncated cone has a constant cone wall thickness with the exception of a local reduction of the cone wall thickness at the predetermined breaking point.

6. The fastening device according to claim 1, wherein the first fastening element and/or the second fastening element has a latching section.

7. The fastening device according to claim 6, wherein the latching section has at least one undercut.

8. The fastening device according to claim 6, wherein the first fastening element for latching connection with the second fastening element or the second fastening element for latching connection with the first fastening element has a latching hook, wherein when a latching connection exists the latching hook engages in the latching section so that the first fastening element is secured to the first fastening element.

9. The fastening device according to claim 1, wherein the first fastening element has a sliding section that acts in conjunction with the guide section when the second fastening element is inserted into the first fastening element, or wherein the second fastening element has a sliding section that acts in conjunction with the guide section when the first fastening element is inserted into the second fastening element.

10. A headlamp assembly having a fastening device according to claim 1 and a headlamp for a motor vehicle.

11. The headlamp assembly according to claim 10, wherein the fastening device and the motor vehicle are formed separately from one another.

12. A motor vehicle having a fastening device according to claim 1, wherein the fastening device and the motor vehicle are formed separately from one another.

13. A kit comprising a plurality of fastening devices, in particular according to claim 1, for different motor vehicles and/or for different headlamps.

14. The kit according to claim 13, wherein the kit comprises:

a plurality of different first fastening elements, and
a second fastening element.

* * * * *